United States Patent [19]
Johnson

[11] Patent Number: 5,202,608
[45] Date of Patent: Apr. 13, 1993

[54] EMERGENCY LIGHTING SYSTEM UTILIZING IMPROVED AND RAPIDLY INSTALLABLE FLUORESCENT INVERTER

[75] Inventor: James C. Johnson, Conyers, Ga.

[73] Assignee: National Service Industries, Inc., Atlanta, Ga.

[21] Appl. No.: 675,165

[22] Filed: Mar. 26, 1991

[51] Int. Cl.$^5$ .................. H02J 9/06; H05B 41/29
[52] U.S. Cl. ..................... 315/86; 315/209 R; 315/DIG. 7; 307/44; 307/66
[58] Field of Search ............. 315/86, DIG. 7, 209 R; 307/44, 66, 37, 46, 48; 363/98, 132

[56] References Cited
U.S. PATENT DOCUMENTS

| | | | |
|---|---|---|---|
| 3,836,815 | 9/1974 | Herzog | 315/86 |
| 4,144,462 | 3/1979 | Sieron et al. | 307/66 |
| 4,751,398 | 6/1988 | Ertz, III | 307/66 |

Primary Examiner—Paul M. Dzierzynski
Assistant Examiner—Michael B. Shingleton
Attorney, Agent, or Firm—Kenneth E. Darnell

[57] ABSTRACT

An emergency lighting system operable on line voltage under normal conditions and on battery power upon failure of line voltage, the system comprises a battery, a battery charging circuit, a line monitor, a lamp/ballast interface and a switching transistor inverter circuit in addition to an electric discharge lamp, ballast and conventional associated circuitry as well as mechanical packaging and connections to line voltage. Advantages in installation and operation of the present emergency lighting system occurs through use of the switching transistor inverter circuit which starts and operates the discharge lamp from the battery on line voltage failure. The emergency lighting system of the invention is rapidly installable through wiring of an associated lighting fixture to the system using power input leads to conventional ballast, thereby substantially simplifying installation of the inverter circuit.

5 Claims, 6 Drawing Sheets

EMERGENCY LIGHTING SYSTEM UTILIZING IMPROVED AND RAPIDLY INSTALLABLE FLUORESCENT INVERTER

DESCRIPTION OF THE PRIOR ART

1. Field of the Invention

The invention relates generally to emergency lighting systems and particularly to improved inverter circuitry for such systems and which can be rapidly installed in on-site situations.

2. Background of the Invention

Wall mounted, incandescent emergency lighting systems have long been known in the art. These prior art systems can be blended with modern office decor only with difficulty since such systems stand out from the wall and, as such, are considered by some to be unsightly. Attempts to improve these conventional wall-mounted emergency lighting systems have been primarily directed to incorporation of emergency functions within existing fluorescent lighting systems. However, even though appearance and other problems are relatively well addressed with this approach, the installation and wiring of such emergency functions in the conventional fluorescent fixture is troublesome and time consuming. The conventional fluorescent fixture utilizes commonly available rapid-start lamps, as well as other lamp types, which have filaments in both lamp ends and therefore four wire attachments per lamp. Accordingly, the installation of additional emergency functions within an already "busy" wireway in fluorescent fixtures has caused the incorporation of emergency functions into existing fluorescent lighting systems to be less than satisfactory in practice. As an example of problems encountered with this approach, prior practice has included the connection of emergency inverter circuitry directly across a fluorescent lamp. Unfortunately, such approaches have resulted in difficulty in that the ballast of such a fixture usually constitutes an unwanted load for the inverter circuitry and consequently battery capacity is reduced when the fixture is placed in an emergency situation, that is, such as when line voltage fails and battery back-up is required. In order to accommodate this basic problem, emergency lighting systems of the prior art utilize relays to separate the inverter circuit from the ballast circuit, thereby requiring that a minimum of two lamp leads be severed and stripped which results in a minimum of four connections to just one lamp end. The remaining connection to the other lamp end requires that at least one more lead be cut and stripped followed by proper termination and insulation. These prior art inverter/ballast arrangements must also allow for an incorporation of a test switch and a pilot light both of which must be properly mounted and wired. Considering further that feed wiring requiring both unswitched (to maintain battery charge) and switched power must be provided, the wiring of prior art emergency lighting systems incorporated into existing fluorescent lighting systems becomes an exacting task to even the experienced electrician.

Improvement upon emergency lighting systems which incorporate emergency functions into existing fluorescent lighting find improvement according to the invention particularly through improvement of inverter circuitry and even more particularly through the lamp/ballast interface portion of such an inverter circuitry. Inverter circuitry per se useful in similar situations, although with the problems referred to above, are shown as examples in U.S. Pat. Nos. 4,751,398 to Ertz, III and 4,682,078 to Pascalide. While the patents to Pascalide and Ertz, III describe inverter circuitry per se, the patents do not overcome a primary problem of the prior art as is described by Herzog in U.S. Pat. No. 3,836,815. Herzog teaches, along with literature citations too numerous to mention, that the starting capacity utilized in most fluorescent ballast is troublesome to inverter circuitry, a fact which causes most prior art inverters to use active switching devices to separate the ballast from the lamp and to connect an inverter for emergency operation. The inverter circuitry of the invention further results in greatly simplified wiring, a particularly difficult problem encountered in prior art approaches to incorporation of emergency functions into existing fluorescent lighting fixture systems.

SUMMARY OF THE INVENTION

The present invention provides an emergency lighting system which particularly includes a fluorescent inverter which improves incorporation of emergency functions into existing fluorescent lighting systems. The inverter of the invention simplifies the interface between a fluorescent lamp and ballast, thereby greatly simplifying the wiring and installation of the emergency lighting system itself. According to the invention, connection is mainly to the primary or supply side of a fluorescent ballast with only one connection being made to the lamp itself. Use of the present inverter also renders possible the mounting of the inverter outside of the fluorescent lighting fixture and the wiring of the inverter to fixture wires which are conventionally available at the fixture access plate. Disposition of the inverter externally of the fixture further provides the advantage of an improved operating environment in that fixture heat effects are minimized and battery life can thus be extended.

The present inverter circuit is incorporated into an emergency lighting system which further includes a battery, a battery charging circuit, a line monitor and a lamp/ballast interface. The emergency lighting system further includes a conventional electric discharge lamp, a conventional ballast, and conventional associated circuitry as well as mechanical packaging and connections to line voltage. Still further, the emergency lighting system includes a test switch and pilot light combined into a single unit and requiring only a single installation step and sharing a simple two wire conductor. Combination of the lamp/ballast interface, inverter circuitry and test switch/pilot light combination results in a simplification of those electrical connections which need to be made by an electrician in an on-site construction situation. The electrical arrangement of these portions of the invention and particularly of the lamp/ballast interface accomplishes isolation on the primary side of the ballast without a need for cutting and stripping leads on the lamp side of a previously wired fixture. One lead of the inverter output can be connected on the primary side of the ballast while the remaining inverter lead is connected on the other side of the lamp using an insulation displacement connector. The connections which thus need to be made by an electrician are reduced on the lamp side from five connections to one connection thereby resulting in a substantial savings of professional time as well as simplification of the circuitry itself. The one connection which must be made on the lamp side does not require cutting of the fixture lead by virtue of the convenient use of an insulation displacement connector.

Accordingly, it is a primary object of the invention to provide an emergency lighting system utilizing an improved fluorescent inverter which enables rapid installation of the emergency lighting system to existing fluorescent fixture systems.

It is another object of the invention to provide a fluorescent inverter circuitry including a lamp/ballast interface with reduced lamp side connections from five connections to one connection with the one connection not requiring the cutting of a fixture lead for installation, thereby simplifying the installation of an emergency lighting system to existing fluorescent lighting.

It is a further object of the invention to provide an improved emergency lighting system using electric discharge lamps such as rapid start lamps and other lamps and a switching transistor inverter circuit for starting and operating the lamp from a battery upon failure of line voltage, the emergency lighting system being wired to existing fluorescent lighting fixtures primarily through the power input leads to the conventional ballast, thereby simplifying installation of inverter circuitry of the emergency lighting system.

Further objects and advantages of the invention will become more readily apparent in light of the following detailed description of the preferred embodiments.

DESCRIPTION OF THE PREFERRED EMBODIMENTS

Figure 1:
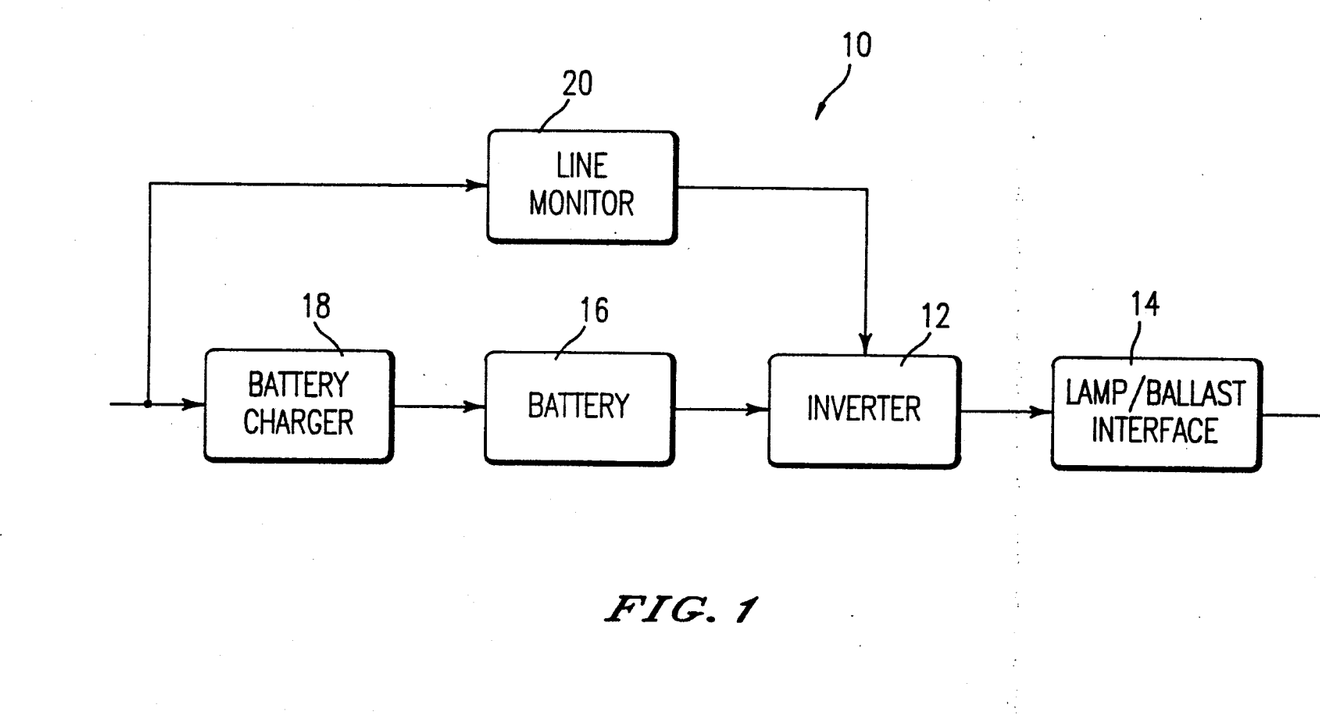
FIG. 1 is a schematic illustrating the location of an inverter circuit within an emergency lighting system.

Referring now to the drawings and particularly to FIG. 1, the basic functions of an inverter system shown generally at 10 are illustrated preliminarily to description of the preferred inverter system according to the invention. The inverter system 10 of FIG. 1 comprises a portion of an emergency lighting system such as can be incorporated into existing fluorescent lighting systems. The inverter system 10 typically comprises an inverter 12 which directly connects to lamp/ballast interface 14. In FIG. 1, the lamp and ballast form a part of a fluorescent lighting fixture (not shown) and need not be shown in FIG. 1 for the illustration intended for this figure. The inverter system 10 further comprises a battery 16, a battery charger 18 and a line monitor 20. In a conventional system, the inverter 12 both starts and operates a discharge lamp (not shown) from the battery 16 upon failure of line voltage. The line monitor 20 acts to monitor line voltage with the inverter 12 starting and operating the discharge lamp (not shown) when the line monitor 20 senses failure of line voltage. As is conventional in the art, the battery charger 18 acts to maintain charge of the battery 16.

As will be described in detail hereinafter, the inverter 12 takes the form according to the present invention of a switching transistor inverter circuitry operable with the lamp/ballast interface 14 to provide the advantages of the invention which have been enumerated above. In order to understand those problems associated with the use of conventional inverter systems used in the environment of the present invention, reference is also made to FIG. 2 which illustrates the electrical structure of a conventional fluorescent ballast. As has been pointed out hereinabove, fluorescent ballasts such as the ballast 22 of FIG. 2 can only be used with difficulty with inverter circuitry due to the fact that the fluorescent ballast 22 includes a starting capacitor 28 which can be operationally detrimental. In most conventional inverter systems used within environments similar to that of the present invention, active switching devices (not shown) must be used to separate the ballast 22 from lamps 26 and to connect an inverter such as the inverter 12 for emergency operation. A starting capacitor 28 of a conventional ballast 22 is connected directly across one of the fluorescent lamps 26. Since the conventional inverter 12 of FIG. 1 has an output which is AC and is usually in the order of 20 to 25 kilohertz, this output when applied directly across one of the lamps 26, such as the lower lamp 26 of FIG. 2, causes the capacitor 28 to appear as a substantial load to the inverter 12 and battery 16 of the system of FIG. 1. Accordingly, sustained performance of an emergency lighting system incorporating the conventional inverter is substantially impaired.

Figure 2:
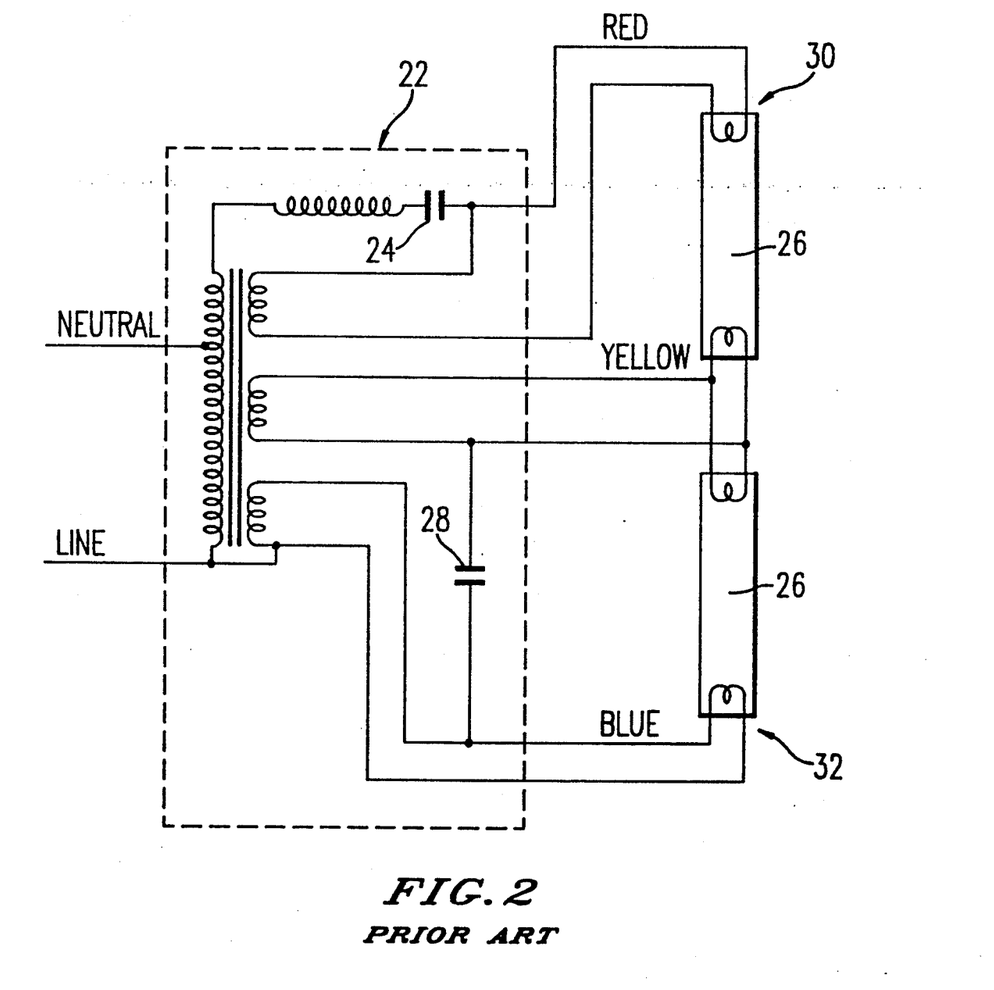
FIG. 2 is a schematic of a conventional fluorescent ballast.
Figure 5:
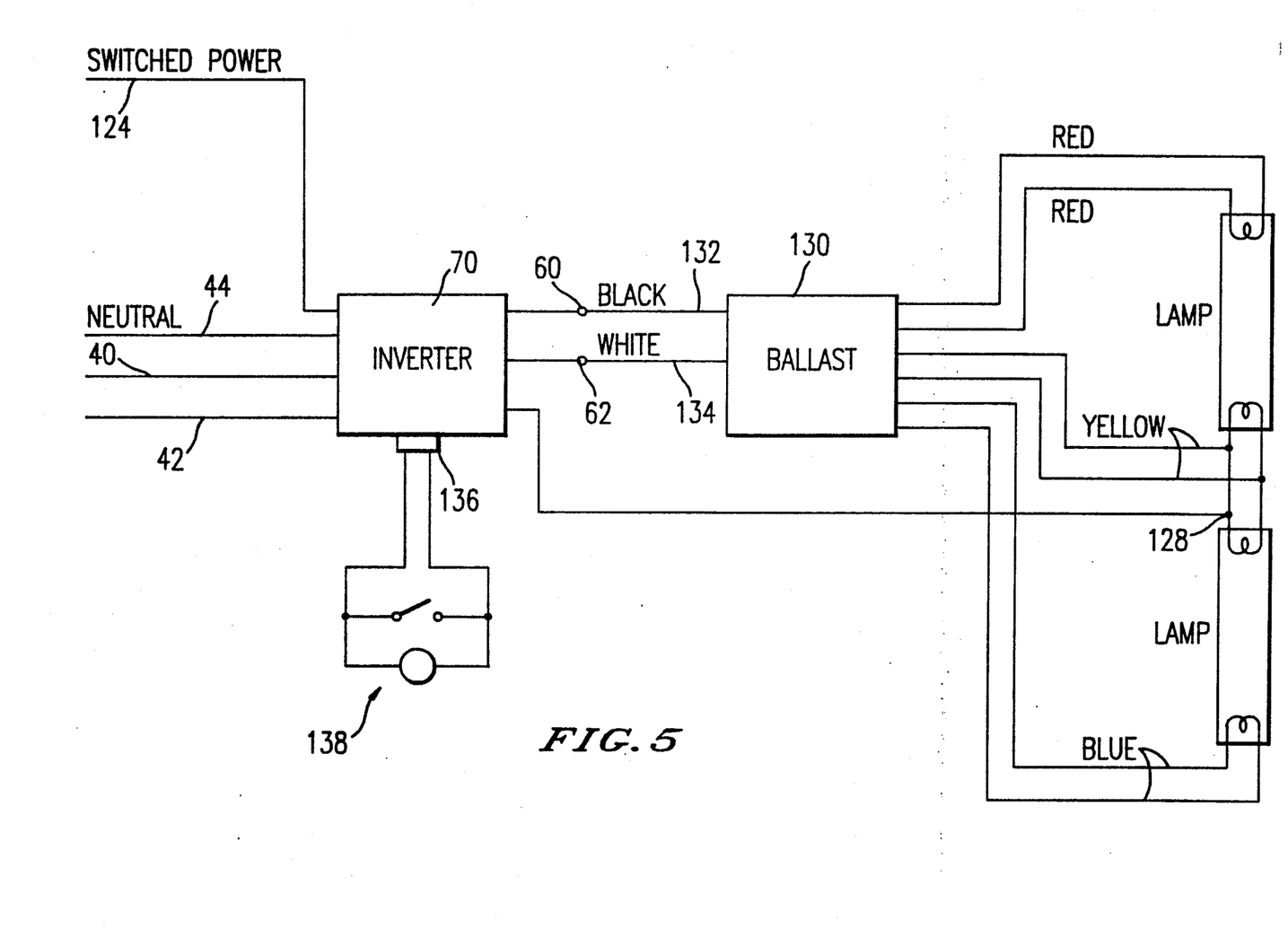
FIG. 5 is a schematic illustrating the simplified electrical connections rendered possible according to the invention; and, FIG. 6 is a schematic illustrating inverter circuitry of the invention incorporated into a further embodiment utilizing a proprietary electrical connection system commonly utilized in the interconnection of a plurality of fluorescent lighting fixtures.

According to the present invention, an inverter system, such as will be described in greater detail relative to FIG. 3, utilizes an output circuit which is of the type utilizing a voltage doubling rectifier circuit. In this system, the output is not AC but is DC or pulsating DC. This inverter output according to the invention causes the capacitors 24 and 28 of FIG. 2 to become blocking devices, that is, the capacitors 24, 28 will charge to some voltage level and cease to conduct upon reaching this level and will no longer represent substantial loads to the inverter function. By taking this approach, it will be understood by those of ordinary skill in the art that it is unnecessary to isolate the ballast 22 from the inverter function such as would be represented by the inverter 12 of FIG. 1 and lamp function such as would be represented by the lamps 26 when the inverter is operating since the ballast 22 represents very little loading when utilizing this inverter output. However, when line voltage is applied to the ballast 22, current must be prevented from flowing through the inverter since damage can occur to the inverter and alteration of normal ballast operation can also occur. As will be described in detail hereinafter, isolation can be accomplished on the primary side of the ballast 22 without the need for cutting and stripping leads on the "lamp side" of a previously wired fixture (not shown). As is seen in FIG. 2, one each of the lamp leads 30 and 32 is connected directly to one end of each of the fluorescent lamps 26. A portion of a winding can be provided in series with this path; however, such a winding represents a small impedance to DC currents. Accordingly, one lead of the inverter output can be connected on the primary side of the ballast 22 with little effect upon inverter operation. The remaining inverter lead can be connected to the other end of the fluorescent lamp using an insulation displacement connector which does not require cutting and stripping. The connections thus allowed according to these teachings are shown in FIG. 5 and will be described in detail relative thereto.

Figure 3:
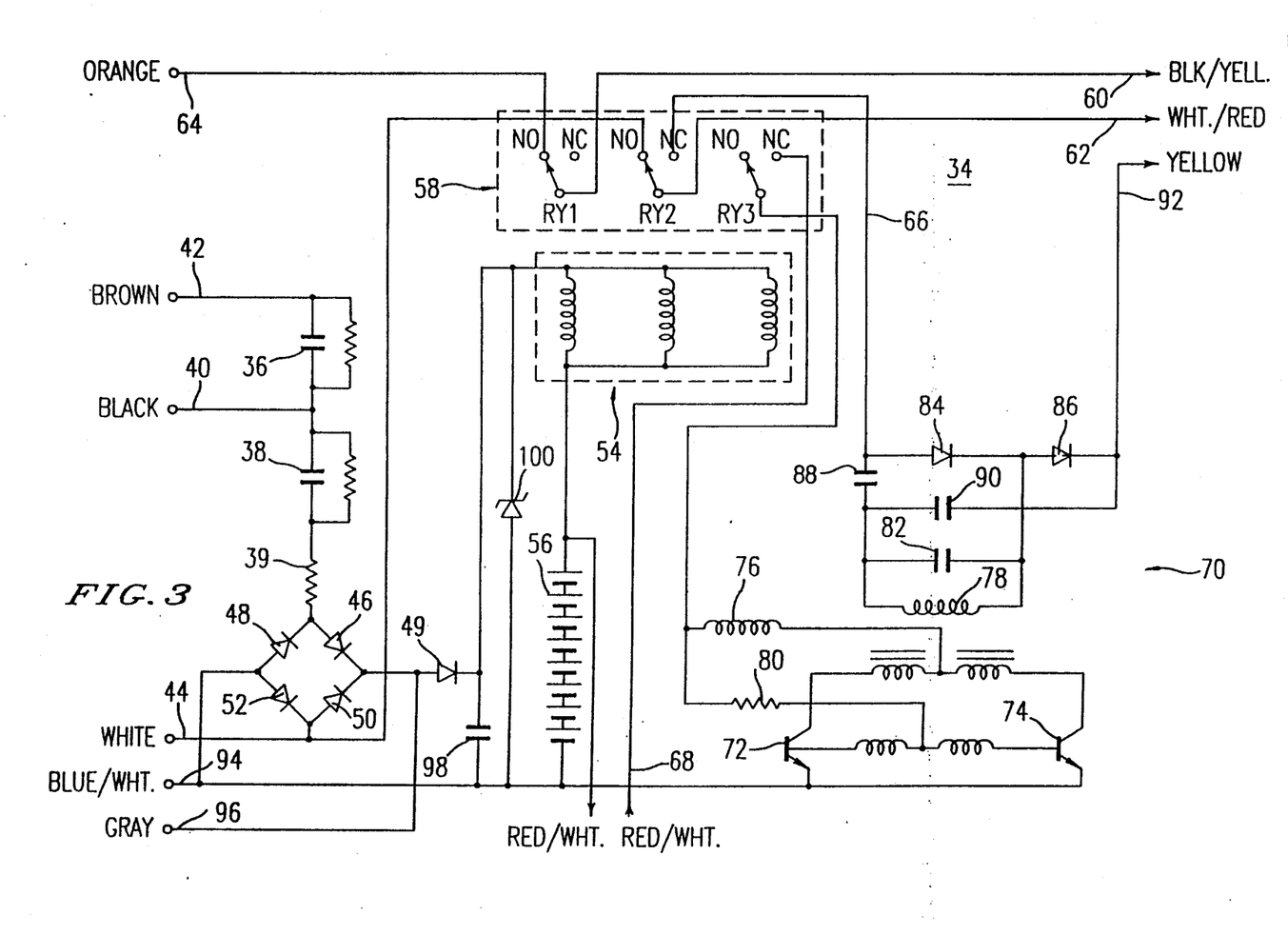
FIG. 3 is a schematic illustrating the circuit diagram of a preferred embodiment of the invention.

Referring to FIG. 3, a preferred embodiment of the invention is illustrated as an emergency lighting system shown generally at 34. A battery charging function is seen to be embodied in that structure which includes capacitors 36, 38 which are AC rated capacitors forming a series impedence to an unswitched AC source (not shown). This unswitched AC source may be either 120 volts applied at the juncture of the two capacitors as seen at 40 or 277 volts applied at point 42, both voltages being with respect to neutral as seen at point 44. The capacitors 36, 38 in combination with diodes 46, 48, 50 and 52 and relay coils 54 form the charging circuit for battery 56. Since the relay coils 54 form a portion of this path, this part of the charging circuit also provides a line monitor function, that is, as long as power is applied at either 40 or 42, current will flow through the relay coils 54 and will keep contacts 58 in the positions shown. However, if power is removed from either 40 or 42, current will be interrupted from the relay coils 54 and the contacts 58 will change state.

In the positions of the contacts 58 shown, that is, the energized position, the first two relays to the left of the figure apply power to a conventional fluroescent ballast (not shown) such as would be connected at points 60 and 62. Power applied at point 64 may be either 120 volts or 277 volts depending upon the ballast which is used. The power applied at point 64 may also be switched since circuit operation or battery charging function are not affected.

Upon the loss of power to point 40 or point 42, the three relay coils 54 cause a change of state, thereby isolating the primary of the ballast (not shown) from its previous connection to point 64 and point 44 and will connect one lead of the ballast primary (not shown) to the inverter output shown at 66. The remaining contacts associated with the relay coil 54 which is to the right in FIG. 3 applies power from the battery 56 through a disconnect at 68 to inverter circuitry shown at 70.

The inverter circuitry 70 comprises transistors 72 and 74, an inductor 76, a transformer 78, a resistor 80, and a capacitor 82. The components 72 through 82 form a self-driven resonant inverter which operates in the 20 to 25 kilohertz range. The output of this inverter circuit 70 is modified by a voltage doubler circuit consisting of diodes 84 and 86 and capacitors 88 and 90. Accordingly, the output appearing at the inverter output 66 or at lead 92 is a high voltage DC or pulsating DC depending upon load. The lead 92 is connected to a lamp (not shown) and is the only connection to the lamp leads (not shown) according to the invention. The lead 92 is preferably connected through use of an insulation displacement connector (not shown) which allows connection to be made to the lamp leads without cutting or stripping the existing fixture wiring.

Although not shown in FIG. 3, points 94 and 96 are available for connection of auxiliary functions such as a test switch and pilot light assembly as shown in other figures and which use only two wires for connection to the points 94 and 96. The test switch and pilot light arrangement useful with the invention comprise a normally open switch in a parallel combination with a light emitting diode pilot light. Such an open switch causes the voltage occurring across the diodes 36, 48, 50 and 52 (which comprise a diode bridge) causes illumination of the light emitting diode pilot light. When such a switch is closed, current is by-passed away from the relay coils 54 and battery 56 to simulate a power outage. The two wire test switch/pilot light arrangement can be attached to the circuit through a plug which incorporates a jumper so that the inverter 70 can be disabled during shipping and installation. A filter capacitor is provided at 98 to smooth charging current and to eliminate relay noise. Further, a zener diode 100 acts to clamp the voltage across the filter capacitor 98 to a safe level if the battery 56 is removed while power is applied to the charger circuit. Resistor 39 is provided for surge reduction and for function as an inexpensive fuse. Diode 49 prevents the battery 56 from back feeding.

Figure 4:
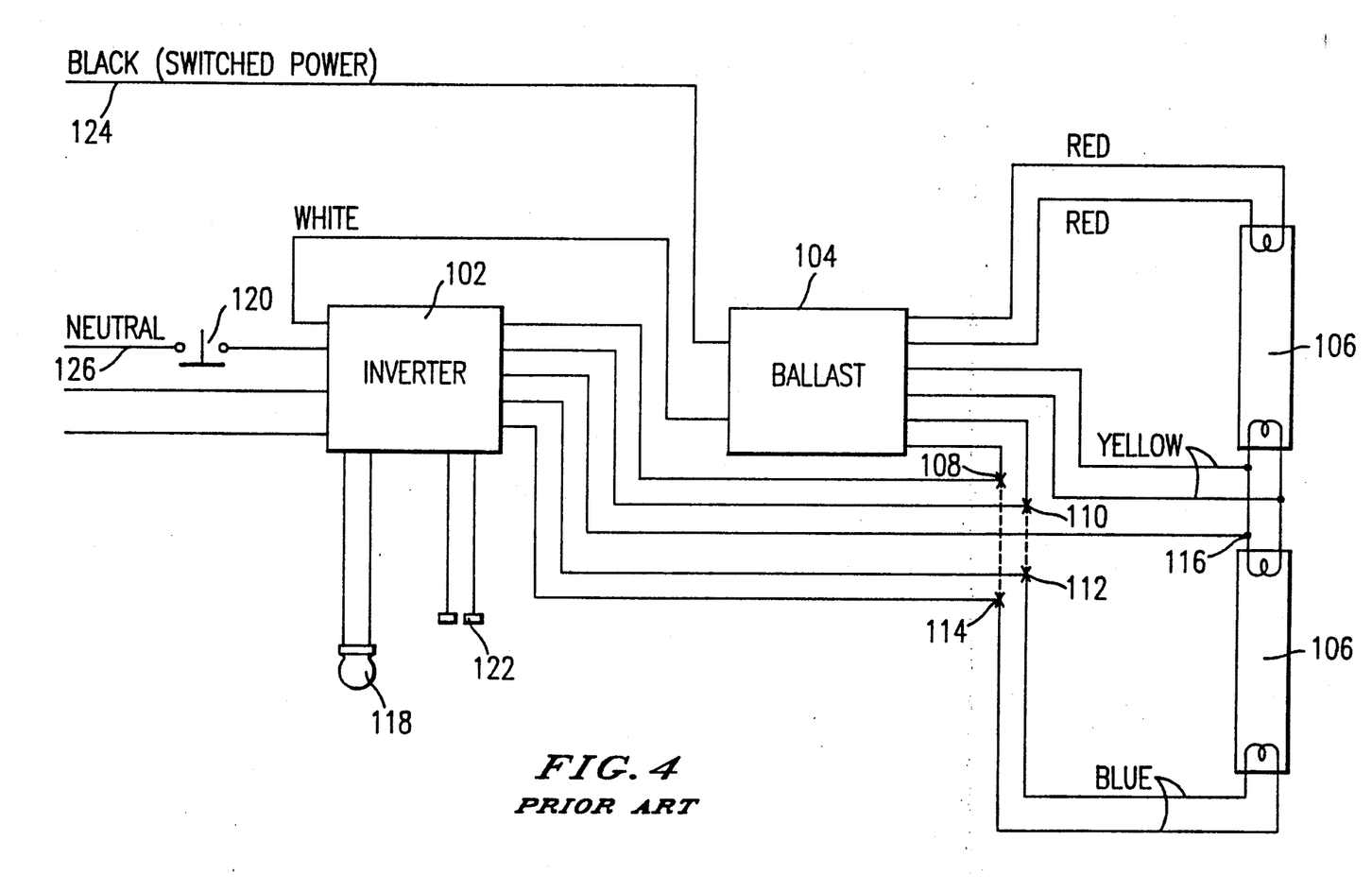
FIG. 4 is a schematic illustrating the electrical connections necessary in a prior art incorporation of an emergency lighting system into a conventional fluorescent lighting fixture.

Referring now to FIG. 4, it is desired to summarize the electrical connections which have previously been required for prior art inverter circuitry. FIG. 4 illustrates a prior art inverter 102 and the connection between a prior art ballast 104 and discharge lamps 106. As seen in FIG. 4, no less than five "lamp side" connections 108, 110, 112, 114, and 116 are required, thereby resulting in a substantial amount of time and effort for an electrician to connect the inverter 102 to the lamps 106. Further, the prior art circuitry shown in FIG. 4 clearly show that an electrician must mount and wire a pilot light 118 and a separate test switch 120. Inclusion of a battery disconnect 122 as is usually provided causes the inverter 102 to have at least thirteen leads which must be dealt with by the electrician in the assembly of an emergency lighting system to an existing fluorescent lighting fixture system. It is often the case that additional lighting fixtures are connected at points 124 and 126. In such a case, the test switch 120 at the location provided within the prior art system of FIG. 4 will not properly function when the switched power at 124 is "off".

FIG. 5 illustrates that the required "lamp side" connections seen at 108, 110, 112, and 114 in FIG. 4 are eliminated through use of the inverter circuit 70 of FIG. 3 by placing the inverter circuit 70 of FIG. 3 in the system diagram of FIG. 5. It is to be seen that only a single lamp side connection 128 generally corresponding to the connection 116 of FIG. 4 is required. The inverter 70 is connected to ballast 130 through the points 60, 62 specified previously in FIG. 3. The ballast line leads 132 and 134 ar thus connected directly to the inverter 70. These line leads 132 and 134 are easily available in all lighting fixtures since they must be connected directly or indirectly to the power bus. In most cases, the line leads 132 and 134 are stripped and may simply be inserted into connectors (not shown) leading from the points 60 and 62. A plug 136 can also be received in the inverter 70 to incorporate a battery disconnect function and to provide connection to a two-wire combination test switch and pilot light arrangement 138 such as has been referred to hereinabove. The test switch and pilot light arrangement 138 uses only two wires and connects to the inverter 70 such as through the points 94 and 96 of FIG. 3. The test switch portion of the arrangement 138 preferably comprises a normally open switch in a parallel combination with a light emitting diode pilot light portion of the arrangement 138. When the switch portion of the arrangement 138 is open, the voltage appearing across the diodes 46, 48, 50 and 52 as seen in FIG. 3 causes the light emitting diode to be illuminated. Closure of the switch causes current to be by-passed away from the relay coils 54 and the battery 56 of FIG. 3 to simulate a power outage. The plug 136 which attaches the arrangement 138 to the inverter 70 incorporates a jumper (not shown) which enables the inverter to be disabled during shipping and installation.

Figure 6:
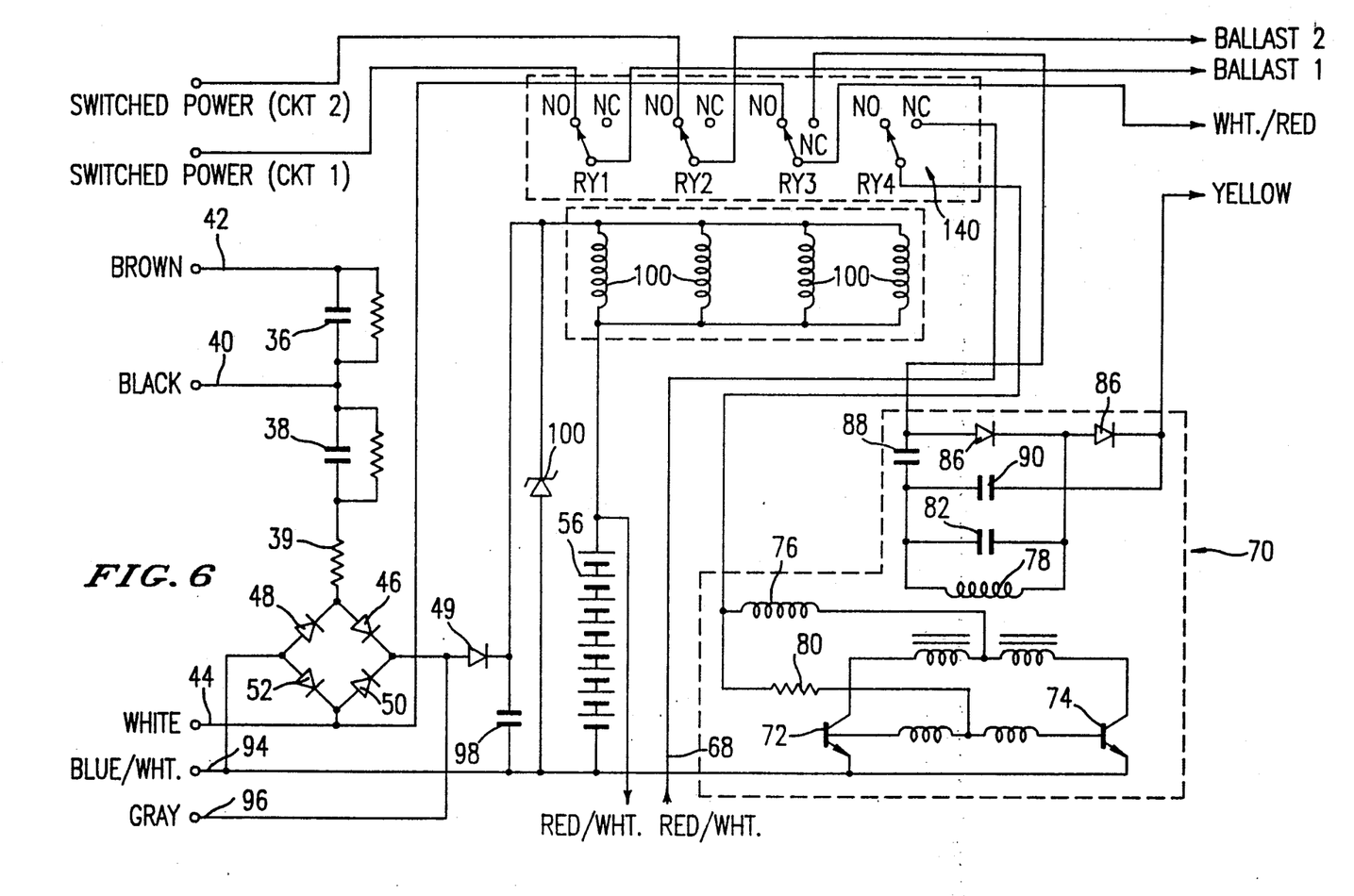

FIG. 6 provides an inverter circuitry according to the invention which is useful with fixture interconnection devices known under the trademark of RELOC, a trademark of Lithonia Lighting, Inc., a division of National Service Industries, Inc., Atlanta, Ga. In the device of FIG. 6, the single wire "lamp side" connection such as is shown at 128 in FIG. 5, allows installation of the inverter circuitry through the conventional access plate of a conventional lighting fixture, thereby eliminating the need to remove the conventional wireway-cover. Since one of the two required inverter lamp connections is made through the line leads which are available at the access plate, installation is readily effected. The other lamp connection can be one of the leads which pass by the access plate (not shown). An added relay contact shown generally at 140 allows accommodation of fixtures having two separately switched ballast which is commonly employed with three-lamp fixtures. By connecting line leads to a common reference point in the emergency mode, any lead which passes the access plate can be utilized. In the circuitry of FIG. 6, two ballasts must be switched instead of one ballast. The relay 140 is necessary to accommodate the additional switched circuit. The circuitry of FIG. 6 is substantially identical to the circuitry of FIG. 3 except as the circuitry relates to the additional relay 140. It is to be noted that the relay coils 142 can be connected in various ways to accommodate other voltage and current ratings.

It is to be understood that the invention can be practiced other than as explicitly shown in the drawings and described herein, the explicit description provided herein being exemplary and not intended to be limiting of the invention.

What is claimed is:

1. An emergency lighting system readily wirable to existing fluorescent lighting fixture without the necessity for cutting and striping leads on a lamp side of a previously wired fixture, the emergency lighting system having a ballast, a discharge lamp and an inverter circuit, the ballast having a primary side and a lamp side connected to the lamp, the lamp having a first side connected to the ballast and a second side not connected to the ballast in emergency mode, the inverter circuit having first and second power output leads and a lamp connection lead, comprising:

first means for connecting the first and second power output leads of the inverter circuit to the primary side of the ballast, the inverter circuit being self-driven;

second means for connecting the lamp connection lead of the inverter circuit to the second side of the lamp, installation of the inverter circuit of the emergency lighting system being simplified by reducing connections required between the inverter circuit and the lamp; and, voltage doubling means for modifying inverter output to produce either a high voltage DC output or a pulsating DC output through the lamp connection lead to the lamp.

2. The emergency lighting system of claim 1 wherein the voltage doubling means comprise a voltage doubling rectifier circuit.

3. The emergency lighting system of claim 1 and further comprising a battery, a battery charging circuit and a line voltage monitor, the battery charging circuit being connected to the inverter circuit through the battery and the line monitor being connected to the inverter circuit, the inverter circuit starting and operating the lamp using power from the battery on a drop in line voltage.

4. The emergency lighting system of claim 1 and further comprising test means connected to the inverter circuit for testing battery condition.

5. A method for electrically connecting an emergency lighting system to existing fluorescent fixture systems, the emergency lighting system having a ballast, a discharge lamp and an inverter circuit, the inverter circuit having first and second output leads and a lamp connection lead, the ballast having a primary side and a lamp side connected to the lamp, the lamp having a first side connected to the ballast and a second side not connected to the ballast emergency mode comprising the steps of:

connecting the first and second power output leads of the inverter circuit to the primary side of the ballast;

connecting the lamp connection lead of the inverter circuit to the second side of the lamp, thererby simplifying installation of the inverter circuit and reducing connections necessary on the lamp side of the ballast to the lamp; and, modifying the output of the inverter circuit to product either a high voltage DC output or a pulsating DC output, thereby isolating the ballast from the inverter circuit.

* * * * *